United States Patent [19]

Skarr et al.

[11] Patent Number: 4,833,383

[45] Date of Patent: May 23, 1989

[54] MEANS AND METHOD OF CAMERA SPACE MANIPULATION

[75] Inventors: Steven B. Skarr; William H. Brockman, both of Ames, Iowa

[73] Assignee: Iowa State University Research Foundation, Inc., Ames, Iowa

[21] Appl. No.: 85,018

[22] Filed: Aug. 13, 1987

[51] Int. Cl.$^4$ .............................................. B25J 19/04
[52] U.S. Cl. ................................. 318/568.16; 901/47
[58] Field of Search ................. 318/568; 901/2, 9, 46, 901/47

[56] References Cited

U.S. PATENT DOCUMENTS

| | | | |
|---|---|---|---|
| 3,165,899 | 1/1965 | Shatto, Jr. | 61/69 |
| 4,044,377 | 8/1977 | Bowerman | 7/18 |
| 4,146,924 | 3/1979 | Birk et al. | 318/568 |
| 4,187,051 | 2/1980 | Kirsch et al. | 414/744 |
| 4,305,130 | 12/1981 | Kelley et al. | 364/513 |
| 4,344,146 | 8/1982 | Davis, Jr. et al. | 7/2 |
| 4,380,696 | 4/1983 | Masaki | 219/124.34 |
| 4,402,053 | 8/1983 | Kelley et al. | 364/513 |
| 4,488,242 | 12/1984 | Tabata et al. | 318/568 |
| 4,575,304 | 3/1986 | Nakagawa et al. | 414/730 |
| 4,707,647 | 11/1987 | Coldren et al. | 318/568 |

OTHER PUBLICATIONS

Wernll, Robert L., "Robotics Undersea", Mechanical Engineering, Aug. 1982.
Jarvis, John F., "Research Directions in Industrial Machine Vision: A Workshop Summary", Computer, Dec. 1982.
Filo, Andrew, "Designing a Robot From Nature Part 2: Constructing the Eye", Byte, Mar. 1979.
Baum, Michael, "Giving a Robot the Eye", Apr. 1979.
Second Generation Robots Have Eye For Industry, DM, Jun. 1979.
Catros, Jean-Yves; Espiau, Bernard, "Utilisation de Capteurs Optiques de Proximite en Robotique Industrielle", Lenouvel Automatisme, May/Jun. 1980.

Primary Examiner—Bentsu Ro
Attorney, Agent, or Firm—Zarley, McKee, Thomte, Voorhees & Sease

[57] ABSTRACT

A means and method for camera space manipulation includes a manipulator arm extending from a base to an outward end. The arm is movable through a work space to accomplish various tasks. One or more cameras are movably oriented towards the arm and work space to capture the arm and work space in what will be called camera space or camera vision. A visual cue is associated with the outward end of the manipulator arm. Additionally, a visual cue is associated with an object which is desired to be engaged by the manipulator arm or by what is held by the manipulator arm. A control device is connected to the camera or cameras and to the manipulator. According to identification and tracking of the visual cues in the camera space, the control device instructs appropriate motors to move the manipulator arm according to estimations for engagement calculated by the control device.

18 Claims, 5 Drawing Sheets

MEANS AND METHOD OF CAMERA SPACE MANIPULATION

BACKGROUND OF THE INVENTION (a) Field of the Invention

The present invention relates to a means and method for autonomous manipulation of a working element or elements, and in particular, control of the working element or elements based on identification tracking in camera space of visual cues associated with the working element or elements and any object or objects which is or are to be engaged.

(b) Problems in the Art

Automatic manipulation, robotics and autonomous manipulation are currently significant and developing areas of technology. A particularly valuable but complex field of development involves manipulation relying on artificial vision of cameras, robots, and computers.

Attempts have been made to give robots vision by incorporating a camera or other sensory means into the system for manipulation. Tass can be performed by pre-programming based on tedious pre-calibration or by human monitoring. No fully acceptable vision application for autonomous manipulation has been developed.

In tasks requiring autonomous manipulation, a common method to use vision is to set up a measured grid or framework which is calibrated to the camera's vision or camera space. Movement or interjection of objects into the actual physical work space is then directly identified via a priori calibration with camera space. The camera space, which in reality is comprised of the electronic or mathematical reproduction of the camera's pictures, can then be processed to identify and track objects within the physical work space and to control manipulation of robotic or mechanical tools or activities. Such systems require significant time and precision in calibration and require maintenance of the original grid or framework for accurate functioning. Such systems would be particularly insufficient in tasks where a grid or framework could not be set up easily in the actual physical work space, such as in outer space or in undersea projects, or in other situations where the base of the manipulator is independent of monitoring cameras.

Other systems have utilized cameras at the very end of a manipulator arm. Such systems do not allow for multi-view cameras to avoid perception distortion and generally require human control of the manipulator.

There is no known autonomous manipulation system which relies completely on camera space manipulation.

It is therefore a primary object of the present invention to present a means and method for camera space manipulation which solves or improves over the problems and deficiencies in the art.

A further object of the invention is to present the above described means and method which does not require calibration or direct identification of physical space with camera space.

Another object of the present invention is to present a means and method as above described which allows remote manipulation of a mechanical arm to engage a remote object in the work space without knowledge of the object's exact position or knowledge of the camera's position.

Another object of the present invention is to present a means and method as above described which functions with regard to moving objects entering the manipulator's work space having an unknown position or orientation relative to the manipulator and/or monitoring cameras.

An additional object of the present invention is to present a means and method as above described which functions even if the manipulator, the camera, or the object are all in slow relative movement to one another.

These and other objects, features, and advantages of the present invention will become more apparent with reference to the accompanying specification and claims.

SUMMARY OF THE INVENTION

The present invention overcomes the problems and deficiencies in the art by utilizing a manipulator means having a controllable arm movable within a work space. One or more cameras are oriented towards the manipulator and arm so that generally the arm and at least a portion of the work space are within the cameras' view or vision.

At least one visual cue (usually more) is associated with the outward end of the arm of the manipulator, either being attached directly to the outward end or being attached to any member or piece grasped or moving rigidly with respect to the outward end. The visual cue is a member which is distinct and differentiable from its surrounding environment and from the manipulator and any other objects in the work space. It must be distinct so as to be identifiable and trackable in the camera space of the cameras.

A visual cue (or more often, depending upon the task, several cues) must also be placed on any object or item which is desired to be engaged by the manipulator arm or any member or piece it holds or is associated with. The visual cues, being on or associated with the manipulator's end member and the work object, are identifiable and trackable in camera space of the cameras. Often, not all cues will be viewable at all times by any of the cameras. A control means receives and processes the identification information from camera space which corresponds with the visual cues.

The control means then calculates a best estimate of the required motion of each degree of manipulator movement required to bring cues into an admissible camera space configuration from the point(s) of view of the controlling camera(s). Using a standard position servoing arrangement, each joint angle is actuated using a motor means and driven toward the required position or sequence of positions.

Two keys to this process are: (1) that the physical accomplishment of many tasks may be construed in such a way that achievement of a prescribed class of cue configurations in the camera space associated with one camera (or, in a three-dimensional case, two cameras) will inevitably coincide with realization of that task; and (2) that the requisite functional relationship between the directly controllable joint coordinates of the manipulator and the location in camera space of manipulable cues may be estimated *as the maneuver is performed* using the method described herein.

By constant monitoring of the work space and visual cues, the control means repeatedly re-estimates the required movement of the manipulator arm to achieve the task, and adjusts movement accordingly. The requisite frequency of reestimation will vary, but should not be prohibitive. This allows the system to function adequately even though the work object may be moving within the work space, the cameras may be moving slowly, or the manipulator base may be moving slowly.

Additionally, the system requires no prior knowledge of any physical location or position of the work piece, the cameras, or the manipulator base.

The present invention is applicable to manipulator arms having one degree of movement, such as in one plane, or with manipulator arms having multiple degrees of movement. In the latter case, it is preferred that at least two cameras be used. General, three-dimensional, rigid-body positioning of one object reltive to another can be accomplished by means of a minimum (task dependent) number of visual cues placed at known locations on "manipulable" and "object" members which are to be joined or otherwise relatively configured.

The invention therefore presents an autonomous manipulation control system based entirely on monitoring in camera space, rather than requiring calibration to actual physical space. The objectives of the maneuvers themselves are specified in terms of admissible camera space cue configurations only, not direct physical-space requirements.

DETAILED DESCRIPTION OF THE PREFERRED EMBODIMENT

The present invention can take many forms and embodiments. Its essential general characteristics include a remotely controllable manipulator member having an arm movable within a work space, one or more cameras oriented so as to at least partially capture the manipulator and work space in camera space, visual cues which can be identified and tracked in the camera space of the camera(s), and a control mechanism which receives information from the manipulator and the camera(s) with respect to the visual cues and then autonomously estimates the required movement and orientation of the manipulator arm to accomplish tasks within the work space, and then controls the manipulator to move according to those estimations. By basing the joint coordinate sequence planning for the maneuver on a combination of camera-space cue configuration requirements and current estimates of the relationship between manipulable camera-space cue positions and joint coordinate values, new vision data can be sequentially figured into the motion planning. This occurs without a priori knowledge of the relationship of the manipulator arm to any object to which it is to be engaged, or knowledge of the location of the manipulator, the manipulator arm, the camera or cameras, or the objects with respect to each other in the work space. It also does not require any direct and comprehensive calibration of the work space to the camera space. The invention therefore is very useful in tasks where there is no ability to have a fixed, permanent frame of reference (such as the ground, a grid or framework, etc.) or where the elements and objects are or can be in relative movement to one another. Current examples of tasks fitting such parameters are work in outer space, in deep water or in any situation where the base of the manipulator is mobile.

Figure 1:
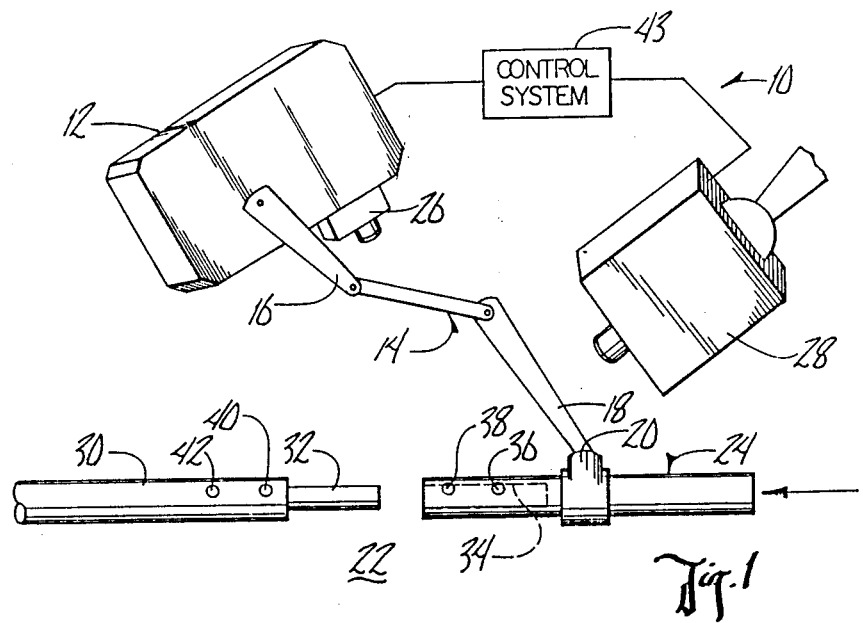
FIG. 1 is a schematic depiction of one possible embodiment of the present invention.

By referring to the accompanying drawings, preferred embodiments of the invention will now be described. FIG. 1 shows generally a camera space manipulation system 10 according to the present invention. A manipulator base 12 has a manipulator arm 14 extending from it. Manipulator arm 14 is shown to have a base end 16 hingedly attached to base 12, and an outward end 18 including a grasping member 20. Manipulator arm 14 is hinged and segmented to allow different orientations of outward end 18 in relationship to base 12 within what will be called the work space 22 which is within reach of arm 14.

It is to be understood that in the embodiment of FIG. 1, manipulator arm 14 is operatively movable with a number of degrees of movement within work space 22 by virtue of drive means (not shown) associated with manipulator base 12 and arm 14. Such drive means are known within the art, especially with respect to robotics. It is also to be understood that grasping member 20 is connected to a drive means (not shown) which allows it to selectively grasp and release things such as member 24.

First camera 26 is mounted within base 12 (although such positioning is not a requirement) and is oriented towards arm 14 and work space 22. Second camera 28 is positioned and mounted at a location unrelated to base 12 and is also oriented towards arm 14 and work space 22.

The embodiment of FIG. 1 illustrates the task of engaging member 24 to work object 30. Work object 30 has a narrowed end 32 which is receivable and matable into a bore 34 in the end of member 24. The task is to align and move member 24 into a mating relationship with work object 30 and also to insure that member 24 and work object 30 are completely brought together.

What will be called visual cues are positioned on both member 24 and work object 30 to facilitate camera space manipulation system 10 to accomplish this task. Visual cues 36, 38 are positioned on the end of member 24 which is to be mated with work object 30. Cues 36, 38 are aligned generally with the longitudinal axis of work object 30 and are spaced apart a predetermined distance. In kind, visual cues 40 and 42 are positioned generally along the longitudinal axis of work object 30 at the same predetermined distance as cues 36, 38. Additionally, it is predetermined that the distance between visual cue 38 of member 24 and visual cue 40 of work object 30 will be that same predetermined distance apart when member 24 and work object 30 are completely brought matingly together. A second set of four cues (not shown), two on each member, is positioned in an azimuthally (or circumferiently) different set of locations.

Visual cues 36, 38 and 40, 42 are high visibility, brightly colored disks which are visually distinct and have high camera space contrast from any of the other elements of the system, any object within the work space, or any of the surrounding environment. A control system 43 (shown schematically in FIG. 1) is in communication with the manipulator and the cameras, and identifies and tracks the visual cues when they enter the camera vision or camera space of the cameras. By sampling camera spaces of first and second cameras 26 and 28 repeatedly, system 10 "sees in camera-space" the location of cues fixed to member 24 with respect to cues fixed to work object 30 from varying angles, and then can determine the sequence of joint coordinates required to mate member 24 with work object 30 (i.e. to achieve the admissible cue configurations described below). The control system then instructs the appropriate drive means to move manipulator arm 14 according to those estimations. As movement starts, the system continuously re-estimates and adjusts movement until the task is completed. Completion is verified by confirming in camera space, from the perspective of one of the cameras, that visual cues 36, 38 and 40, 42 are linearly aligned and that the respective spacing between them is equal. Simultaneous alignment of a *different* set of four cues in the camera space of the other camera is also required. The control system can then instruct the grasping member 20 to release member 24 and the task is completed.

It is to be understood that advances in image processing and computer vision may eliminate the requirement for high visibility visual cues (p. 9) although useful identifiable points must be recognized by the vision system.

System 10 therefore allows autonomous completion of the task without knowledge of the mapping of physical space into camera space, and without knowledge of camera locations relative to the base of the manipulator. Operation of the system does require knowledge by control system 43 of the relationship between the outer end 18 of manipulator arm 14, and the joints of manipulator arm 14 with respect to manipulator base 12, and knowledge of whether work object 30 is stationary, and if not, it must have models for predicting its trajectory within the relevant camera spaces. Finally, the system is constrained by the requirement that manipulation based upon "vision" through camera space must be made compatible with the constraints and limits of the physical space and physical limits of the manipulator.

It is to be understood that experimental results have confirmed that a straight line between visual cues 36, 38 and 40, 42 in the actual physical work space reasonably and sufficiently maps into a straight line in the camera space of the system. This is accomplished by arbitrary location of first and second cameras 26 and 28. Additionally, by using the visual cues, conventional image analysis techniques are avoided, allowing the task to be operated in essentially "real time" (roughly equivalent to the processing time of the camera's images which is about 60 images per second or more). It is also to be understood that the "straight line" cue configuration is but a special case of a large number of possible admissible cue configuration sets which might be selected for other tasks.

By referring to FIGS. 2, 3, 4, 5, 6, 7A, 7B, and 7C, a more specific preferred embodiment of the invention will be described. This embodiment is a rather simplified version compared to that of FIG. 1, but experimentally confirms the fundamental theories of the invention and provides specific control system structure for a particular application.

Like the embodiment of FIG. 1, the embodiment of FIGS. 2-7 has as an objective, the manipulation of a manipulator arm 44 to autonomously engage and capture a work object 64. The associated camera-space objective is particularly simple in this instance. It is to bring about a coincidence of the end-effector cue with the projectile (object) cue. The embodiment of FIG. 2 differs in that work object 64 is interjected into the work space and is moving with respect to the manipulator arm 44.

Manipulator arm 44 includes a base end 48, an extension 50, and a receiving cup 52 having its opening 54 oriented outward from its outward end. Base end 48 is secured to a perpendicular shaft 56 rotatably secured in manipulator base 58. One end of shaft 56 is operatively connected to a rotary drive motor 60. The other end of perpendicular shaft 56 is operatively attached to a potentiometer 62. Motor 60 rotates shaft 56 to move manipulator arm 44 angularly in a plan. Motor 60 can move arm 44 either upwardly or downwardly. In this embodiment therefore, manipulator arm 44 has only one degree of movement; it can be tilted angularly in one plane only.

Work object 64 is a small sphere; in this particular embodiment, a ping pong ball. It is interjected into work space 66 by propelling it out of an air cannon 68 having its barrel 70 aligned with the plane of movement of manipulator arm 44. Thus, the degree of uncertainty of the trajectory of ping pong ball 64 is generally limited to how high or low it will intersect with the arc of movement of receiving cup 52 of arm 44. The angular attitude of barrel 70 is changeable to test different trajectories of ping pong ball 64.

It is to be understood that both receiving cup 52 and ping pong ball 64 comprise visual cues 72 and 74 respectively. Visual cues 72 and 74 can be created by painting or otherwise making ping pong ball 64 and receiving cup 52 bright and distinct from the surrounding environment. The requirement is that ball 64 and cup 52 be so distinct that the system can perceive and identify rapidly these cues in camera space.

Camera 76 having lens 78 is randomly oriented to bring at least receiving cup 52 and a portion of work space 66 into its view or vision. This is called the camera space of camera 76, and represents the two-dimensional picture captured by lens 78. Camera 76 and lens 78 comprise a conventional black and white video camera such as is known in the art.

Figure 2:
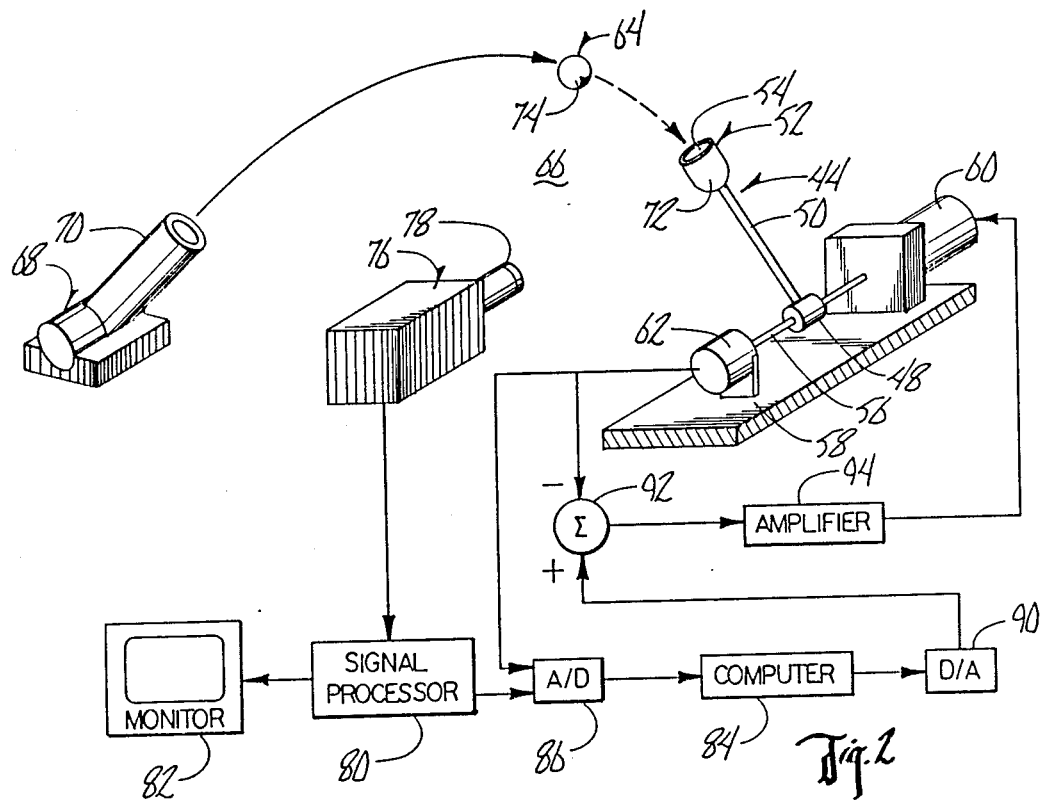
FIG. 2 is a schematic view of a more restricted embodiment of the present invention.

The control system for the embodiment of FIG. 2 includes a signal processor circuit 80 which receives the video pictures from camera 76 comprising "camera space" and which identifies and tracks visual cues 72 and 74, calculating their positions in camera space and preparing those calculations for use by the control system. A conventional video monitor 82 is operatively connected to signal processor circuit 80 and allows display of the camera space.

A digital computer 84 operating under appropriate software, operates the control system. Calculations from signal processor circuit 80, being analog, are converted by analog-to-digital (A/D) converter 86 for input into digital computer 84. Likewise, the calibrated analog values of potentiometer 62 are converted by converter 86 and input into computer 84. Computer 84 therefore continuously and instantaneously is provided with information concerning the location of visual cues 72 and 74 in camera space from signal processing circuit 80, and the angular orientation of manipulator arm 44 from potentiometer 62. By appropriate software programming, including programming of known kinematics and trajectory of ping pong ball 64 over time, computer 84 can compute and estimate the trajectory of ping pong ball 64 and the required movement of manipulator arm 44 to catch ping pong ball 64 in receiving cup 52.

Such computations and estimations are done repeatedly over the course of the maneuver. In this embodiment joint angle position objectives are redetermined every tenth of a second, or after every sixth video sample. Computer 84 then takes these estimations and outputs a digital to analog signal (by D/A converter 90) which is input into summing comparator 92, which also concurrently receives the present signal from potentiometer 62. The signal from potentiometer 62 represents the current calibrated position of manipulator arm 44 relative to its own base, whereas the signal from digital to analog converter 90 represents an instruction whether the arm is too high or too low compared to the estimated point of intersection of ping pong ball 64 with receiving cup 52. Summing comparator 92 therefore produces an error signal which is introduced into amplifier 94, which in turn inputs that amplified error signal into rotary drive-motor 60. Depending on the nature of the error signal (positive or negative) motor 60 causes shaft 56 to rotate which moves manipulator arm 44 up or down to conform to the estimation.

Figure 3:
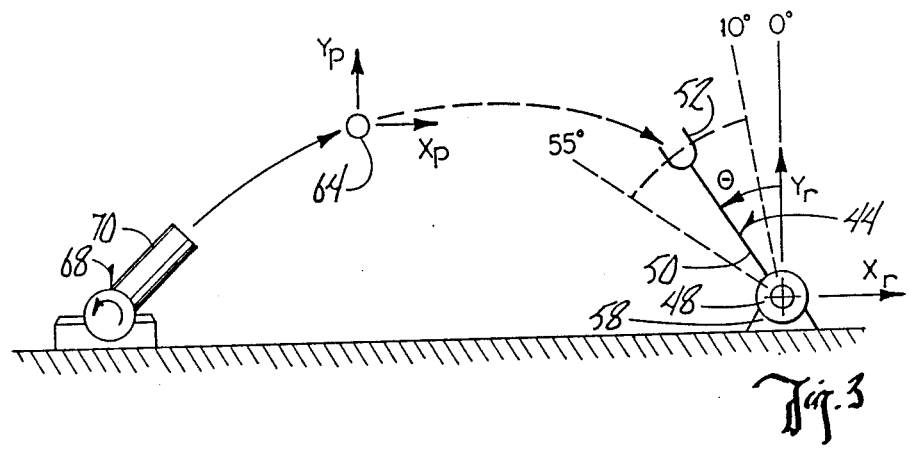
FIG. 3 is a partial schematic of the embodiment of FIG. 2 depicting the variable movement parameters of the manipulator arm and the work objects.

FIG. 3 depicts in isolation an elevational schematic view of air cannon 68, and manipulator base 58 with manipulator arm 44. As can be seen, manipulator arm 44 is calibrated to move through an angle $\theta$ (theta). In this embodiment, $\theta$ is generally calculated from vertical and then counterclockwise to the left. In the preferred embodiment, $\theta$ generally was limited between 10° and 55° from vertical. Traditionally, $Y_r$ and $X_r$ form work space coordinates regarding the position of manipulator base 58, receiving cup 52, and ping pong ball 64.

Figure 4:
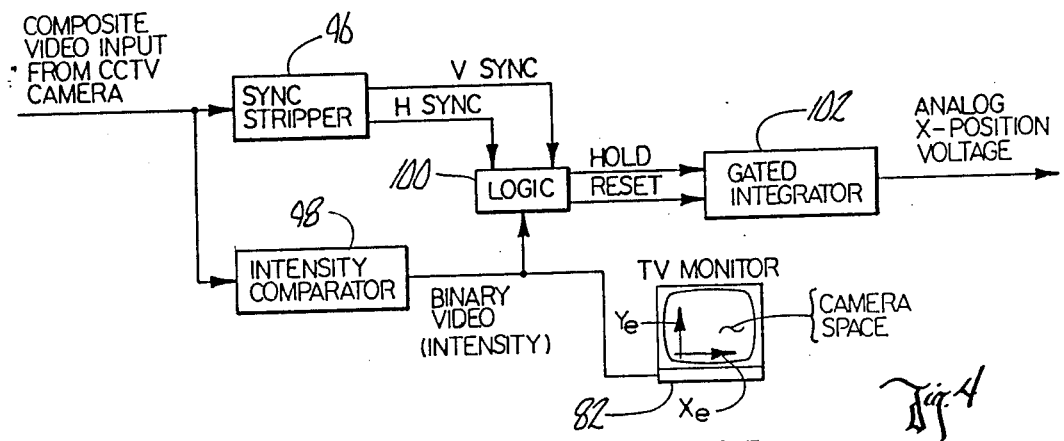
FIG. 4 is a schematic block diagram of the signal processing circuitry of the embodiment of FIG. 2.
Figure 5:
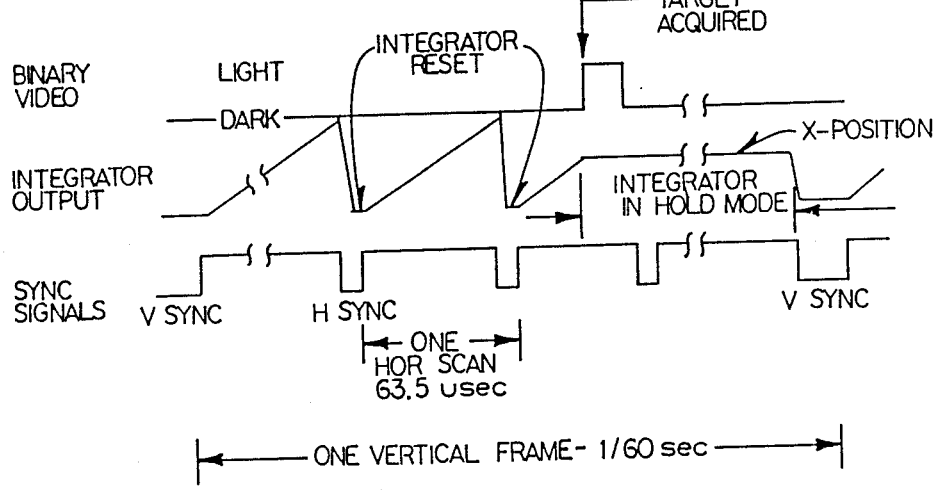
FIG. 5 is a timing diagram regarding operation of the signal processing circuit.

By referring to FIGS. 4 and 5, an embodiment of the circuitry and functioning of signal processor 80 can be described. FIG. 4 illustrates the circuitry which generates the X position data of object 64. The composite video input from closed circuit video camera 76 is introduced into sychronization stripper 96, such as is well known within the art, which separates or strips the horizontal and vertical syncronization signals from the composite video signal. The composite video input is also, by parallel wiring, introduced into intensity comparator 98 which produces a binary version of the intensity signal of the composite video signal. The vertical and horizontal sychronization signals and the binary video intensity signal are logically combined in logic device 100 to control gated integrator 102. This is done by having logic 100 produce either a hold or reset signal which, depending upon the input of the vertical and horizontal sychronization signals and the binary video intensity signal, is introduced to gated integrater 102.

Gated integrator 102 produces a constant slope ramp that is reset by each horizontal sychronization (H SYNC) signal. The instantaneous value of the ramp voltage corresponds to the X-position (measured from the left of the screen of video monitor 82) of the horizontal scan. When the camera scan encounters a bright target area (such as work object 64 or receiving cup 52), integrator 102 is gated into a hold mode which is maintained briefly by a monostable multi-vibrator circuit. The resultant constant output of integrator 102 provides X- position data available for analog-to-digital conversion by A/D converter 86 so that it can be input into digital computer 84.

The method by which Y-position data (measured from the top of the screen of video monitor 82) is generated and is essentially the same except that the ramp integrator is reset with the vertical synchronization signal. By utilizing this procedure, the coordinate data are provided to computer 84 without any pixel (picture element of the video monitor) examination and can be updated at a rate of 60 Hz with each new video field.

As is further shown in FIG. 4, the binary video signal is also input into video monitor 82 to allow visual verification of the position of the work object 64. FIG. 5 depicts the functioning of the circuitry of FIG. 4 with respect to X- position data. It is to be understood that the Y-position data signals would differ only as noted above.

In the preferred embodiment of FIG. 2, a digital computer 84 can be a Digital Equipment Corporation (DEC) model Professional 380. It receives the X and Y position data from the signal processor circuitry 80. The computer 84 carries out a control algorithm programmed according to task and also controls analog-to-digital and digital-to-analog conversions, and performs real-time computations.

DEC Professional 300 series Analog Data Module equipment is also utilized for the analog-to-digital converter 86. It converts the analog signals representing the camera space location of the target object (work object 64) and the angular position of arm 44 into 16-bit values. The Analog Data Module also contains an 8-bit output strip from which the data describing the desired angular position of arm 44 is sent to D/A converter 90. Referring back to FIG. 2, it can be seen that manipulator arm 44 is controlled by sending continuous analog feedback of its angular position by operation of potentiometers 62. The reference signal from D/A converter 90 is compared with the signal representing the actual joint angle of arm 44 obtained from potentiometer 62 attached to the axis of arm 44. This comparison is accomplished by summing amplifier 92. The resulting error signals are then amplified and used to drive motor 60.

In the preferred embodiment of FIGS. 2 and 3, the length of arm 44 and receiving cup 52 is 25 inches. Opening 54 and receiving cup 52 into which work object 64 enters measured 2.4 inches. The diameter of conventional ping pong ball (work object) 64 is 1.5 inches.

As shown in FIG. 3, the range through which arm 44 can move is described by the angle $\theta$ and was, $10° \leq \theta \leq 55°$. The system was also timed to determine that arm 44 could move from one angular extreme to the other in approximately 0.75 seconds from rest to rest.

The operational algorithm used by digital computer 84 to achieve control of the system will now be described. A central requirement of camera-space control is the ability to identify the relationship that exists between the directly controllable joint coordinate(s) of the manipulator and a location and camera space of its end tip or other relevant manipulatable cues. If this identification is to be repeated in real time throughout the course of the maneuver, then it is most advantageous to have a reasonably good model of that relationship so that a minimal number of parameters must be estimated.

The relationship that exists between the joint coordinate(s) and location of the end tip in real space is therefore first established by setting up base coordinates. The unknown location and attitude of camera 76 is then accounted for by generalizing this functional relationship using parameters that are to be sequentially updated throughout the course of the maneuver. It is to be understood that the model used to account for uncertainty of the camera perspective may need to be supplemented to account for uncertainty of grasp. Also, many aspects of the camera distortion are not accounted for using this model but should produce relatively small effects that will vary from region to region in camera space and joint space. Error due to unmodelled distortion can be dealt with by weighting more heavily those measurements made near the region of interest (where work object 64 more closely approaches receiving cup 52) in camera space.

In the present system there are three modelled variables; camera rotation, distance, and in-plane displacement.

Coordinates $(X_r, Y_r)$ denote the coordinates in real space of the end cue (receiving cup 52) as shown by the coordinate axes in FIG. 3. Coordinates $(X_e, Y_e)$ represent the coordinates of the same cue in relevant camera space (see FIG. 4).

Referring to FIG. 3, $X_r$ and $Y_r$ can be expressed as follows:

$$X_r = b \cos(\theta + \pi/2) \quad \text{(Eq. 1)}$$

$$Y_r = b \sin(\theta + \pi/2) \quad \text{(Eq. 2)}$$

The second modelled variable, rotation of the frame of reference of camera 76, is accomplished by using Euler parameters such as are known in the art and as are described in Morton, H., Junkins, J. & Blanton, J., "Analytical Solutions For Euler Parameters", *Celestial Mechanics*, 10, D. Reidel Publishing Company, Dordrecht-Holland, 1974, pgs. 287–301. By referring to FIG. 6, p is assumed to be a unit vector (which is referred to the $X_r$, $Y_r$ axes) in the direction of the axis about which the camera is rotated to achieve its current perspective. $\phi$ is the angle of rotation about that axis. The Euler parameter elements become:

$$\beta_0 = \cos \tfrac{1}{2}\phi \quad \text{(Eq. 3)}$$

$$\beta_1 = p_x \sin \tfrac{1}{2}\phi \quad \text{(Eq. 4)}$$

$$\beta_2 = p_y \sin \tfrac{1}{2}\phi \quad \text{(Eq. 5)}$$

$$\beta_3 = p_z \sin \tfrac{1}{2}\phi \quad \text{(Eq. 6)}$$

These Euler parameter elements must conform to the following equation:

$$\beta_0^2 + \beta_1^2 + \beta_2^2 + \beta_3^2 = 1 \quad \text{(eq. 7)}$$

Using direction cosine elements expressed in terms of Euler parameters, the functional form of the required relationship generalizes to:

$$X_e = b(\beta_0^2 + \beta_1^2 - \beta_2^2 - \beta_3^2)\cos\left(\theta + \frac{\pi}{2}\right) + \quad \text{(Eq. 8)}$$

$$2b(\beta_1\beta_2 + \beta_0\beta_3)\sin\left(\theta + \frac{\pi}{2}\right)$$

$$Y_e = 2b(\beta_1\beta_2 - \beta_0\beta_3)\cos\left(\theta + \frac{\pi}{2}\right) + \quad \text{(Eq. 9)}$$

$$b(\beta_0^2 - \beta_1^2 + \beta_2^2 - \beta_3^2)\sin\left(\theta + \frac{\pi}{2}\right)$$

Variable distance of camera 76 from the manipulator can be accounted for by eliminating length b as well as the constraint of Eq. (7).

In-plane camera translation or displacement is modelled by adding the constants $X_{eo}$ and $Y_{eo}$, respectively, to each of Eqs. (8) and (9). This would result in the following equations:

$$X_e = (\beta_0^2 + \beta_1^2 - \beta_2^2 - \beta_3^2)\cos\left(\theta + \frac{\pi}{2}\right) + \quad \text{(Eq. 10)}$$

$$2(\beta_1\beta_2 + \beta_0\beta_3)\sin\left(\theta + \frac{\pi}{2}\right) + X_{eo}$$

$$Y_e = 2(\beta_1\beta_2 - \beta_0\beta_3)\cos\left(\theta + \frac{\pi}{2}\right) + \quad \text{(Eq. 11)}$$

$$(\beta_0^2 - \beta_1^2 + \beta_2^2 - \beta_3^2)\sin\left(\theta + \frac{\pi}{2}\right) + X_{eo}$$

It can therefore be seen that six parameters are necessary to describe the relationship of interest.

Figure 6:
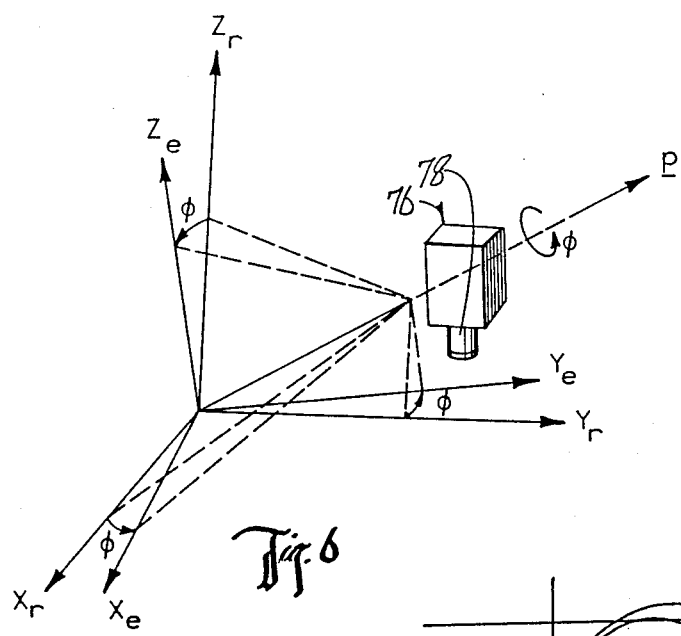
FIG. 6 is a schematic view of a camera depicting translation of its positioning and orientation to that of the work space.

In the testing of the preferred embodiment of FIG. 2, rotation of camera 76 was limited to rotation around the $p_y$ or vertical axis as depicted in FIG. 6. Equations (10) and (11) thus are reduced to a substantially simplified form which simplifies the parameter identification task:

$$X_e = C_1 \cos\left(\theta + \frac{\pi}{2}\right) + C_2 \quad \text{(Eq. 12)}$$

$$Y_e = C_3 \sin\left(\theta + \frac{\pi}{2}\right) + C_4 \quad \text{(Eq. 13)}$$

A combination of equations (12) and (13) results in an elliptical form for the camera-space arc of the receiving cup 52 end cue given by:

$$\frac{(X_e - C_2)^2}{C_1^2} + \frac{(Y_e - C_4)^2}{C_3^2} = 1 \quad \text{(Eq. 14)}$$

In addition to estimation of the coefficients of the end-tip curve of receiving cup 52, another task of computer 84 is to estimate and predict the trajectory of the projectile (work object 64) once it is launched. As is well-known, in physical space, this trajectory is nearly parabolic, although because of air drag it is not exactly parabolic. It is known that a parabola in real space will, within a relatively small error, map into a parabola (though different) in camera space. If $(X_p, Y_p)$ denote the cameraspace coordinates of the projectile, the functional form to which the projectile curve is fit for the purpose of predicting its point of intersection with the arc of the manipulator's receiving cup 52 is given by:

$$Y_p = K_0 + K_1 X_p + K_2 X_p \qquad \text{(Eq. 15)}$$

It is to be understood that equation (15) assumes the limited camera rotation previously discussed.

An additional task of computer 84 is to periodically solve for the projected point of intersection of the projectile arc with the end-tip arc (work object 64 arc with receiving cup 52 arc). In the preferred embodiment computer 84 performs this task at a rate of approximately 10 Hz throughout the maneuver. Computer 84 then outputs a signal to the servomechanism (rotary drive motor 60) which drives arm 44 and end-tip receiving cup 52 towards this directed position.

Determination of the point of intersection of the two arcs or curves is achieved by solving equations (14) and (15) simultaneously for the applicable root (X, Y). For the single-degree-of-freedom system of the preferred embodiment of FIG. 2, trajectory planning is not a significant issue, and the reference input $\theta_r$, to servomechanism rotary drive motor 60 consists of a 10 Hz sequence of step inputs based upon the current intersection estimate (X, Y) as well as equations (12) and (13) combined to give:

$$\theta_r = \tan^{-1}\left[\frac{C_1(Y - C_4)}{C_3(X - C_2)}\right] - \frac{\pi}{2} \qquad \text{(Eq. 16)}$$

This reference signal is calculated at 10 Hz frequency (rather than 60 Hz at which video inputs are acquired) because of the significant amount of computer time involved in determining and outputting $\theta_r$. It is also only necessary to redetermine the $C_i$ and $K_j$ coefficients at the lower 10 Hz rate. A recursive algorithm is therefore not used for this purpose. Matrix inversions are performed after every six video frames to determine least-square best-estimates of the parameters. It has been found that the vision data may be enriched significantly and the quality of estimates improved by supplementing the cue on the manipulator's end tip (on receiving cup 52) with another visual cue at the joint or elbow (at base end 48 of arm 44). $C_2$ and $C_4$ are directly interpretable as the X and Y camera-space coordinates, respectively, of this elbow cue. Although this additional information significantly increases speed at which the manipulator's joint-space vs. camera-space relationships may be reestimated in time, it has the disadvantage of requiring that joint cues must fall within the same camera-space field of view as the end-tip cue and the object cue(s). This puts some limitations on an important feature of camera-space control, which is the ability to realize a high degree of placement precision by zooming a camera in on a relatively small field of view within which only the object cue and end-tip cue are located.

Estimation of parameters $C_1$ through $C_4$, and $K_0$ through $K_2$ is further refined through error management. Through experimentation it was discovered that significant, random measurement error exists. It was found that the position variability due to measurement error was normally distributed with a standard deviation between 0.2 percent and 0.3 percent of the full camera-spaced dimension. It is to be noted that the models of equations (12), (13), and (15) to which the end-tip and projectile arcs are fit also contain error for reasons already discussed. In the event that the relationship between the camera's position and that of the manipulator's base is allowed to vary slowly with time, the degree of model error is increased.

A systematic means of "weighting" measurements taken both close in with regard to camera-space vicinity an in time to the projected point of the manipulator-workpiece interaction is utilized.

It was found that to the extent a non-uniform weighting of recent measurements is used, the adverse effect of measurement error upon estimates tends to increase. Conversely, such a weighting tends to reduce the adverse effects of model error. A technique has been devised to weight measurements in such a way to minimize the expected value of the square of estimate errors based upon a priori statistical knowledge regarding model error and measurement error. See Sage, A. and White, C., *Optimum Systems Control*, PrenticeHall, Inc., Englewood Cliffs, N.J., 1977. Testing revealed that a particular amount of deweighting of early measurements compared with recent measurements tends to improve dramatically the frequency of task successes when compared with uniform weighting on the one hand and an excess weighting of current measurements on the other.

Figure 7A:
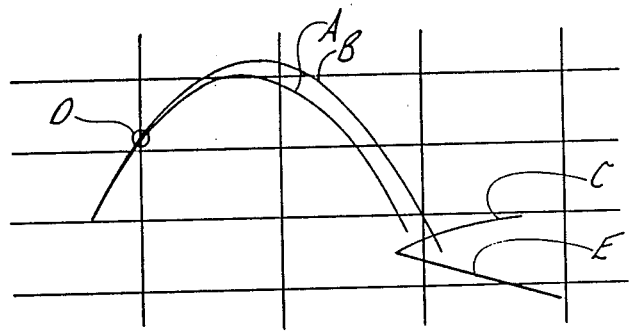
FIGS. 7A-C are schematic representations of successive estimations and movements of the work object and the manipulator arm.
Figure 7B:
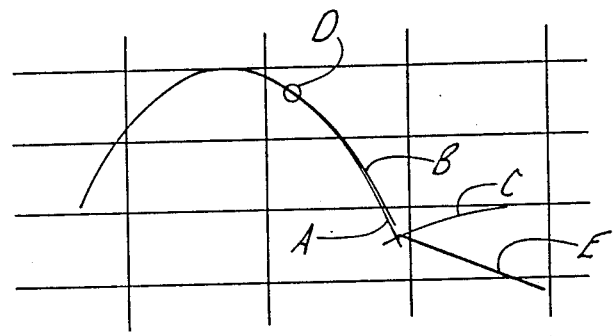
Figure 7C:
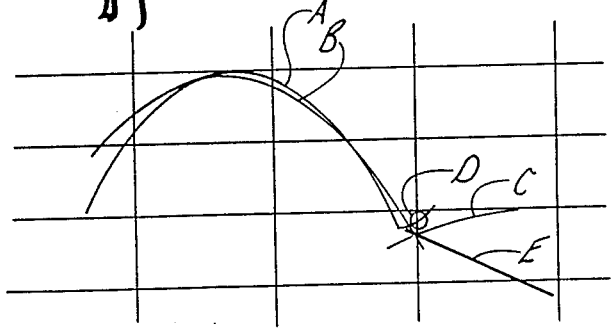

FIGS. 7A–C illustrate three selected frames from a typical trajectory sequence for the work object (ping pong ball) 64 of FIG. 3. Each frame indicates curves A, B and C. Curve A is the actual camera-space arc of projectile or work object 64, and is exactly the same for each of the three frames. Superimposed upon curve A is curve B which represents the current weighted best-estimate of the parabola derived from equation (15) that fits the arc of curve A. The parabolic camera-space arc (curve B) changes with each frame.

Curve C represents the current weighted best-estimate of the camera-space ellipse derived from equation (14) for the end tip (receiving cup) 52 of the manipulator arm 44.

Symbol D in each of the frames represents the current location of the ping pong ball projectile or work object 64, whereas line E represents the current position and location of arm 44 in camera space.

As described above, computer 84 outputs step reference signals to the position servomechanism (motor 60) of arm 44 based upon the most recent projected point of intersection of the end-tip arc C with the projectile arc B. As the projectile 64 nears arm 44, this projected camera-space intersection point converges toward the actual camera-space intersection point. If estimates of this point early in the maneuver are sufficiently good to drive arm 44 in the right direction initially, the tip or receiving cup 52 of arm 44 arrives at this arc intersection point in advance of the projectile 64 and the camera-space task is successful. It has been found that each time the event was successful in camera space, it was also successful in physical space; projectile 64 was actually caught by receiving cup 52.

The present invention is applicable to manipulators having multiple-degrees-of-freedom. Facilitation of such systems requires extension of the models of equations (10) and (11), to make them applicable to n degrees of freedom instead of one degree of freedom. The more general counterparts to equations (10) and (11) are:

$$X_e = f_x(\theta_1, \theta_2, \ldots, \theta_n; C_1, C_2, \ldots, C_m) \quad \text{(Eq. 17)}$$

$$Y_e = f_y(\theta_1, \theta_2, \ldots, \theta_n; C_1, C_2, \ldots, C_m) \quad \text{(Eq. 18)}$$

for an n-degree-of-freedom manipulator with m parameters. An incremental displacement in camera space $(dX_e, dY_e)$ would then be expressed as:

$$dX_e = \sum_{i=1}^{n} g_{xi}(\theta_1, \ldots, \theta_n, C_1, \ldots, C_m) d\theta_i + \quad \text{(Eq. 19)}$$

$$\sum_{j=1}^{m} h_{xj}(\theta_1, \ldots, \theta_n, C_1, \ldots, C_m) dC_j$$

$$dY_e = \sum_{i=1}^{n} g_{yi}(\theta_1, \ldots, \theta_n, C_1, \ldots, C_m) d\theta_i + \quad \text{(Eq. 20)}$$

$$\sum_{j=1}^{m} h_{yj}(\theta_1, \ldots, \theta_n, C_1, \ldots, C_m) dC_j$$

where $$g_{xi} = \frac{\partial f_x}{\partial \theta_i} \quad \text{(Eq. 21)}$$

$$h_{xj} = \frac{\partial f_x}{\partial C_j} \quad \text{(Eq. 22)}$$

and so on. It is noted that over time, and accounting for possible measurement error, the part of the changes in cue camera-space location that is not due to measured, corresponding changes in the joint coordinates, is attributed to parameter variations.

To incrementally update the parameters $c_i$, (i=1,2,...,m), would involve adding a differential correction $\Delta C_i$ to each parameter after k measurements of the joint coordinates and camera-space end tip coordinated. (See Junkins, J.L., *An Introduction To Optimal Estimation of Dynamical Systems*, Sijthoff and Noordhoff International Publishers, Alphen Aan Den Rign, 1978, pgs. 29-33). This process would proceed as follows.

Once a "sufficiently large" number of cue and joint-coordinate measurements have been made at instants of time denoted by $t_1, t_2, \ldots, t_k$, a parameter correction vector $\underline{\Delta C}$ is computed according to $$\underline{\Delta C} = (A^T W A)^{-1} A^T W \underline{R} \quad \text{(Eq. 23)}$$

where the 2k elements of the vector of residuals, R, are given by $$R_{2i-1} = X_e(t_i) - f_x(\theta_1(t_i), \ldots, \theta_n(t_i), C_1, \ldots, C_m) \quad \text{(Eq. 24)}$$

$$R_{2i} = Y_e(t_i) - f_y(\theta_1(t_i), \ldots, \theta_n(t_i), C_1, \ldots, C_m) \quad \text{(Eq. 25)}$$
$$i = 1, 2, \ldots, k$$

where the 2k×m matrix A has elements given by $$A_{(2j-1,i)} = h_{xi}(\theta_1(t_j), \ldots, \theta_n(t_j), C_1, \ldots, C_m) \quad \text{(Eq. 26)}$$

$$A_{(2j,i)} = h_{yi}(\theta_1(t_j), \ldots, \theta_n(t_j), C_1, \ldots, C_m) \quad \text{(Eq. 27)}$$
$$j = 1, 2, \ldots, k; \; i = 1, 2, \ldots, m$$

where W is a weighting matrix as discussed earlier, and where $C_1$ through $C_m$ represent the current values of the parameters.

The frequency at which parameters may be updated is not limited by the number of parameters, since the same measurements may be reused in consecutive update calculations simply by using the most current values of the parameters $C_i$ in Eqs. (24)-(27).

Figure 8A:
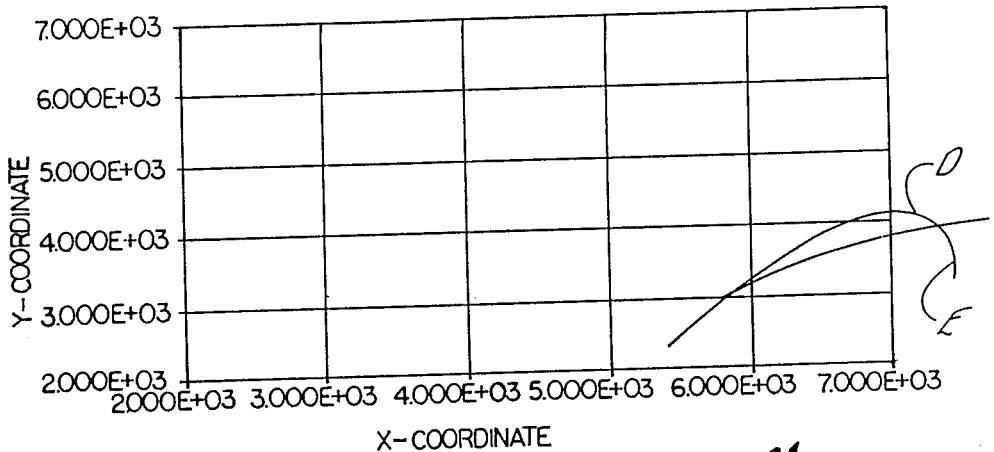
FIGS. 8A and 8B are schematic representations of plots showing estimations of travel of work object versus manipulator arm for two different camera angles.
Figure 8B:
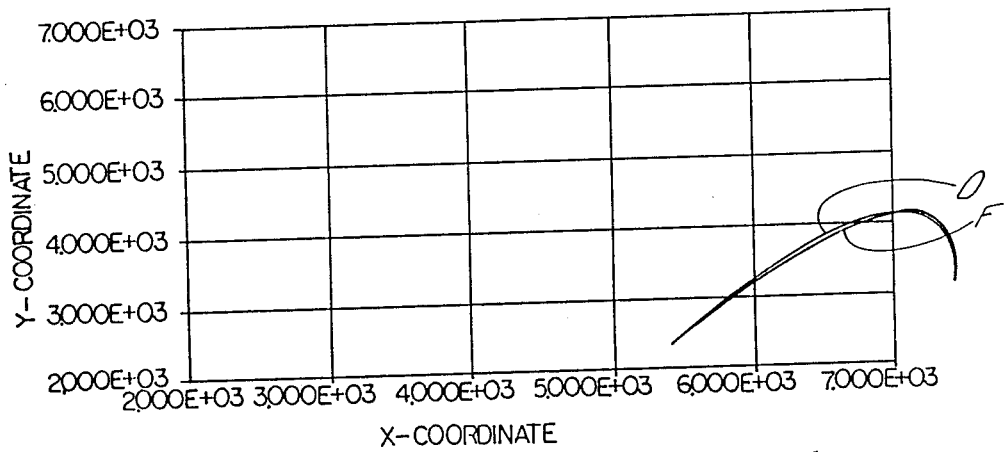

The ability of the six-parameter model of equations (10) and (11) to capture the essential character of the camera space versus joint-space relationship for the one-degree-of freedom arm is indicated in FIGS. 8A and 8B. This pair of superimposed plots, typical of the several others that were made using a variety o radically different camera perspectives, contrasts the six-parameter model with the four-parameter model of equations (12) and (13). Both FIGS. 8A and 8B show the same actual camera-space trace (curve D) of the end-tip cue of arm 44 of FIG. 2 as it proceeds to a particular 40° rotation in physical space. The curves D represent twenty-nine discrete measurements connected by straight lines.

Superimposed upon this trace (curve D) in FIG. 8A is the least-squares best fit of the four-parameter model (curve E), whereas in FIG. 8B, the corresponding fit of the six-parameter model (curve F) is superimposed. Despite a great variety of camera positions and rotations, the model of FIG. 8B fits the camera space end-tip arc equally well. It was noted that the unmodelled parallax distortion due to the camera's relatively short focal length did little to adversely effect the six-parameter model's fit.

Using known manipulator kinematics, in selecting a convenient Cartesian reference frame fixed to the base of the manipulator, the relationship between the real-space end-tip cue location $(X_r, Y_r, Z_r)$ and the joint coordinates of the manipulator $(\theta_1, \theta_2, \ldots, \theta_n)$ can be represented as:

$$X_r = r_x(\theta_1, \theta_2, \ldots, \theta_n) \quad \text{(eq. 28)}$$

$$Y_r = r_y(\theta_1, \theta_2, \ldots, \theta_n) \quad \text{(Eq. 29)}$$

$$Z_r = r_z(\theta_1, \theta_2, \ldots, \theta_n) \quad \text{(Eq. 30)}$$

Applying the direction cosine matrix elements which depend upon the Euler parameters in FIG. 6 and Eqs. (3)-(7), the general six-parameter model becomes:

$$X_e = (\beta_0^2 + \beta_1^2 - \beta_2^2 - \beta_3^2)r_x + 2(\beta_1\beta_2 + \beta_0\beta_3)r_y$$
$$+ 2(\beta_1\beta_3 - \beta_0\beta_2)r_z + X_{eo} \quad \text{(Eq. 31)}$$

$$Y_e = w(\beta_1\beta_2 - \beta_0\beta_3)r_x + (\beta_0^2 - \beta_1^2 + \beta_2^2 - \beta_3^2)r_y$$
$$+ 2(\beta_2\beta_3 + \beta_0\beta_1)r_z + Y_{eo} \quad \text{(eq. 32)}$$

It is to be noted that additional parameters $r_x, r_y$, and $r_z$, may be included in these functions to reflect "uncertainty of grasp".

As was done with regard to the one-degree-of-freedom model, the constraint on the Euler parameters of equation (7) can be dropped and $X_{eo}$ and $Y_{eo}$ are added to account for unknown camera displacement.

The required camera-space relationships of equation (17)-(22) may then be related to the manipulator's physical kinematics. Temporary cue obscuration due to visual interference with the manipulator or temporary exiting of cues from camera-space become less critical to the extent that equations (31) and (32) are accurate models. For example, in the case of the ping pong projectile, data taken near the peak of the ball's arc was often lost, due to the trajectory leaving the view of the camera, with no adverse consequences. Camera servoing might be used to adjust the camera's perspective to address the obscuration problem. Because this would temporarily invalidate current six-parameter estimates, an alternative and better approach would be to make use of multiple, redundant cameras, each having associated with it current estimates of its own six parameters. Manipulator control would then shift among the cameras depending upon which supplied the most advantageous current information.

It will be appreciated that the present invention can take many forms and embodiments. The true essence and spirit of this invention are defined in the appended claims, and it is not intended that the embodiments of the invention presented herein should limit the scope thereof.

The present invention is also applicable to many different functions and processes. It is based on nonlinear modeling and real-time identification which generalizes known, nominal manipulator kinematical relationships which can take into account an unknown or slowly-changing manipulator/camera juxtaposition, slightly uncertain nominal kinematics, and/or uncertainty of grasp.

The present invention presents advantages which are significantly beneficial with regard to conventional physical space manipulation, when applied, for example, to manufacturing processes. Cameras utilized in the present invention may be servoed, zoomed, jarred, or otherwise moved relative to the base of the manipulator without an adverse effect upon placement precision or the ability to manipulate effectively. The base of the manipulator is also free to be mobile relative to the camera(s), which is made possible because of real-time identification of camera-space cue location as compared to joint-coordinate vector relationships in which "uncertainty-of-view" parameters are estimated.

The precision with which nominal manipulative kinematics are known does not limit the precision of placement. Although kinematics are exploited in the identification model, optimal or suboptimal measurement weighting schemes may be used to increase placement precision in the camera-space region of interest despite small errors in the nominal kinematic model. Load-induced, configuration-dependent distortions can be accommodated along with adverse effects from jarring and the like. Such capabilities allows the possibility of less expensive lighter-weight manipulators.

Uncertainty of manipulator grasp can be accommodated by simply including as "parameters to be estimated" dimensions and rotations associated with the unknown geometric relationship between end-effector and the grasped object. Additionally, many of the difficulties associated with coordinating two or more manipulators may be directly circumvented if requirements for successful task completion are specified in the same (camera) frames of reference as current positions and relative positions are being sensed. Improved collision avoidance may be possible by the present invention by reducing reliance on precise nominal kinematics in camera calibration for adequate relative placement precisions.

A specific example of the process according to the present invention is set forth below to further aid in understanding of the invention.

Figure 9:
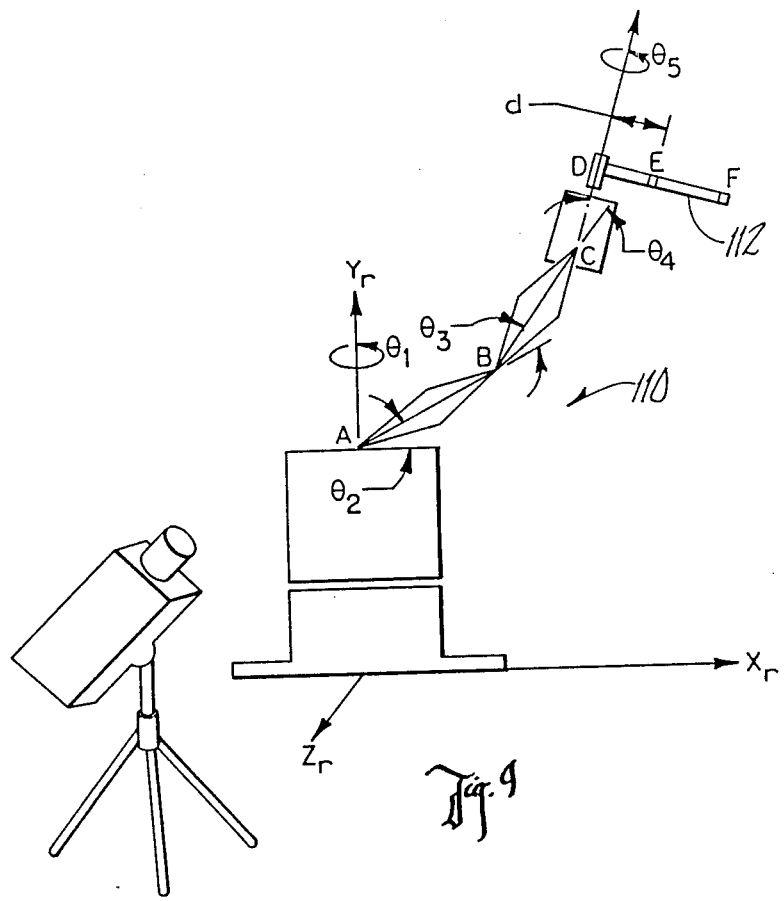
FIG. 9 is a schematic view of another possible embodiment of the present invention.

The mathematical detail associated with a particular multi-axis manipulator is provided below. A schematic of the manipulator system 110 with grasped pencil 112 is shown in FIG. 9. (Due to suspect hardware joint resolution associated with $\theta_1$, only four of the five axes of rotation ($\theta_2$–$\theta_5$) were utilized in the double-cue experiments. The angle associated with the first joint, $\theta_1$, was held at zero throughout.)

One degree of grasp uncertainty (in addition to six degrees of view uncertainty) was used in these trials—the distance d as indicated in FIG. 9. Thus, seven parameters rather than six are estimated based upon measurements associated with a particular trajectory. Denoting this unknown grasp parameter by $C_7 \equiv d$, Eqs. (28)–(30) become, for the particular case of cue 1.

$$r_{x1} = (9 \text{ in.})[\cos(\theta_2) + \cos(\theta_2 + \theta_3)] + (5.3125 \text{ in.}) \\ [\cos(\theta_2 + \theta_3 + \theta_4)] + (C_7 + 3 \text{ in.}) \\ [\sin(\theta_2 + \theta_3 + \theta_4)\cos(\theta_5)] \quad (A1)$$

$$r_{y1} = (9 \text{ in.})[\sin(\theta_2) + \sin(\theta_2 + \theta_3)] + (5.3125 \\ \text{in.})[\sin(\theta_2 + \theta_3 + \theta_4)] - (C_7 + 3 \\ \text{in.})[\cos(\theta_2 + \theta_3 + \theta_4)\cos(\theta_5)] \quad (A2)$$

$$r_{z1} = -(C_7 + 3 \text{ in.})\sin(\theta_5) \quad (A3)$$

Similar expressions, also involving $C_7$, are generated for cue 2. These are denoted by $r_{x2}$, $r_{y2}$, and $r_{z2}$.

$$r_{x2} = (9 \text{ in.})[\cos(\theta_2) + \cos(\theta_2 + \theta_3)] + (5.3125 \\ \text{in.})[\cos(\theta_2 + \theta_3 + \theta_4)] + (C_7)[\sin(\theta_2 + \theta_3 \theta_4)\cos(\theta_5)] \quad (A4)$$

$$r_{y2} = (9 \text{ in.})[\sin(\theta_2) + \sin(\theta_2 + \theta_3)] + (5.3125 \\ \text{in.})[\sin(\theta_2 + \theta_3 + \theta_4)] - (C_7)[\cos(\theta_2 + \theta_3 + \theta_4)\cos(\theta_5)] \quad (A5)$$

$$r_{z2} = -(C_7)\sin(\theta_5) \quad (A6)$$

where it is noted that the subscript 1 refers to the cue at the end tip and the subscript 2 refers to the inside cue.

The estimation parameters $C_1$–$C_6$ are identified with constants of Eqs. (31) and (32) as follows:

$$C_1 \equiv \beta_0 \quad (A7)$$

$$C_2 \equiv \beta_1 \quad (A8)$$

$$C_3 \equiv \beta_2 \quad (A9)$$

$$C_4 \equiv \beta_3 \quad (A10)$$

$$C_5 \equiv X_{co} \quad (A11)$$

$$C_6 \equiv Y_{co} \quad (A12)$$

The expressions for the camera-space cue locations, $f_{x1}$, $f_{x2}$, $f_{y1}$, $f_{y2}$ are found from Eqs. (31) and (32) combined with Eqs. (A1)–(A6). For example, the expression for $f_{x1}$ would be $$f_{x1} = (C_1^2 + C_2^2 - C_3^2 - C_4^2)r_{x1}(\theta_2, \ldots, \theta_5; C_7) + \\ 2(C_2C_3 + C_1C_4)r_{y1}(\theta_2, \ldots, \theta_5; C_7) + \\ 2(C_2C_4 - C_1C_3)r_{z1}(\theta_2, \ldots, \theta_5; C_7) + C_5 \quad (A13)$$

The elements in the matrix A of Eqs. (26) and (27) are extended to the double-cue case according to:

$$A_{(4j-3, i)} = \frac{\partial f_{x1}}{\partial C_i}(\theta_2(t_j), \ldots, \theta_5(t_j); C_1, \ldots, C_7) \quad (A14)$$

$$A_{(4j-2, i)} = \frac{\partial f_{y1}}{\partial C_i}(\theta_2(t_j), \ldots, \theta_5(t_j); C_1, \ldots, C_7) \quad (A15)$$

$$A_{(4j-1, i)} = \frac{\partial f_{y2}}{\partial C_i}(\theta_2(t_j), \ldots, \theta_5(t_j); C_1, \ldots, C_7) \quad (A16)$$

-continued $$A_{(4j,i)} = \frac{\partial f_{y2}}{\partial C_i}(\theta_2(t_j), \ldots, \theta_5(t_j); C_1, \ldots, C_7) \quad (A16)$$

$$j = 1, 2, \ldots, 34 \quad i = 1, 2, \ldots, 7$$

Thus, for example, where measurements were made at 34 instants throughout the trajectory $$A_{(1,7)} = \frac{\partial f_{x1}}{\partial C_7}(\theta_2(t_1), \ldots, \theta_5(t_1); C_1, C_2, \ldots, C_7) = \quad (A18)$$

$$(C_1^2 + C_2^2 - C_3^2 - C_4^2)[\sin(\theta_2(t_1) + \theta_3(t_1) +$$

$$\theta_4(t_1))\cos(\theta_5(t_1))] + 2(C_2C_3 + C_1C_4)[-\cos(\theta_2(t_1) +$$

$$\theta_3(t_1) + \theta_4(t_1))\cos(\theta_5(t_1))] + 2(C_2C_4 - C_1C_3)[-\sin(\theta_5(t_1))]$$

The vector of residuals of Eqs. (24) and (25) is, for the double-cue case, given by $$R_{4i-3} = X_{c1}(t_i) - F_{x1}(\theta_2(t_i), \ldots, \theta_5(t_i); C_1, \ldots, C_7) \quad (A19)$$

$$R_{4i-2} = Y_{c1}(t_i) - F_{y1}(\theta_2(t_i), \ldots, \theta_5(t_i); C_1, \ldots, C_7) \quad (A20)$$

$$R_{4i-1} = X_{c2}(t_i) - f_{x2}(\theta_2(t_i), \ldots, \theta_5(ti); C_1, \ldots, C_7) \quad (A21)$$

$$R_{4i} = Y_{c2}(t_i) - f_{y2}(\theta_2(t_i), \ldots, \theta_5(t_i); C_1, \ldots, C_7) \quad (A22)$$

$$i = 1, 2, \ldots, 34$$

where $X_{c1}(t_i)$, $Y_{c1}(t_i)$, $X_{c2}(t_i)$ and $Y_{c2}(t_i)$ are the actual measured camera-space coordinates of the two cues at time $t = t_i$, and $\theta_2(t_i), \ldots, \theta_5(t_i)$ are the corresponding measured joint coordinates.

Figure 10A:
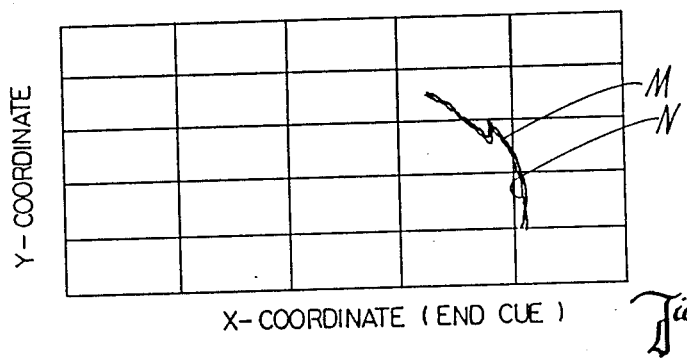
FIGS. 10A and 10B are schematic representations of plots depicting actual measured traces of each cue, super imposed upon estimation models for movement of the cues.
Figure 10B:
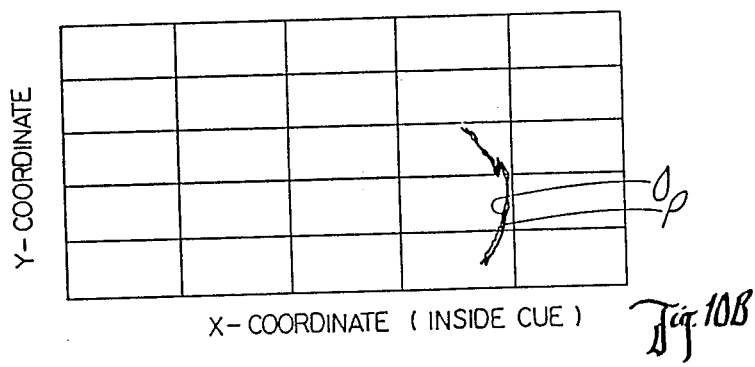

For the purpose of generating FIGS. 10A and 10B, the weighting matrix W of Eq. (23) was chosen to be the identity matrix. Thus, each of the 68 point measurements (34 for each cue) was factored equally into estimates of $C_1$ through $C_7$. Six-digit parameter convergence typically occurred after between five and ten parameter correction calculations, depending upon the initial parameter guesses, the manipulator trajectory, and the camera's perspective.

Three tests were made using the two cues with the single uncertainty-of-grasp parameter. Both camera positions and manipulator trajectories were altered in the three runs. An effort was made to change the rotational position of the camera relative to the base of the manipulator by 20° to 40° between runs in a fairly random manner between tests. FIGS. 10A and 10B represent a superposition of the actual, measured trace of each cue and the model's best, least-squares estimate of that trace (e.g. Eq. A13) based upon the actual sequence of the vector of joint coordinates. It is to be understood that FIGS. 10A and 10B illustrate the "goodness-of-fit" of the preferred estimation model. One degree of grasp uncertainty ($C_7$) and six degrees of view uncertainty ($C_1$–$C_6$) are present in this case. Note that each curve appears at first glance to be a single trace. Actually, two superimposed traces are present in each figure. (Curves M and N in FIG. 10A, representing actual versus estimated model traces respectively, are curves O and P in FIGS. 10B representing the same.) The first of these (M and 1005 O) is the actual, measured trace of each cue as the arm was exercised through an arbitrary trajectory using four axes of rotation. The second is the model's prediction of the same trace based on best parameter estimates in the region and the actual sequence of joint coordinates used for the maneuver.

A review of the vector of converged residuals reveals that the physical placement error anywhere along any of the traces in the three trials would be less than one tenth of one inch. (Note that this assessment relies upon rough knowledge of the scaling factor between physical and camera spaces.) Part of each residual is due to random vision measurement error and therefore would not correspond to actual lack of placement precision. The portion of any given residual that is attributable to model error (and would therefore result in a physical deterioration of placement precision) should be significantly reducible, however, by an appropriate selection of W to "favor" measurements near the region of interest.

For reference with regard to FIG. 9 regarding manipulator system 110, the distance between points A and B, and between points B and C, can be 9 inches. The distance between points C and D can be 5.3125 inches. The distance between points D and E (which in turn equals d), and the distance between points E and F can be 3 1033 inches.

One point regarding a lack of compatibility between the hardware used and the theoretical development should be made. It is assumed that our vision measurements are identified with a single physical point on the manipulable object. Since the vision system detects edges, not centroids, of the cues, and since the cues themselves are not, in this experiment, completely located on a flat surface, this assumption is not fully realized, resulting in additional, minor error.

What is claimed is:

1. A camera space manipulation control system, utilizing at least one camera means for engaging a manipulator means with an object where there is not required any known prior three-dimensional physical space relationship between the manipulator means the object, and the camera means, between physical space and the two dimensional image at the focal plane of the camera means, denoted as camera space, comprising:

an articulatable manipulator means of known nominal kinematics in physical space extending from a base to an outward end for movement of the outward end in a predefined physical work space in the physical space relative to the base, the manipulator means including a motor means for articulating the manipulator means in said physical space, and means for producing a signal identifying an approximate position and orientation of the manipulator means with respect only to the base, wherein the kinematic description of the manipulator means with respect to the base being known;

at least one camera means each positionable in physical space without any previously known relation and correlation to the manipulator means except that each camera means must be oriented towards the manipulator means for providing camera vision of at least the outward end of the manipulator means in at least a part of tee physical work space to view, at least intermittently, at least the outward end of the manipulator means in the camera space;

a first visual one means associated with the outward end of the manipulator means;

a second visual cue means associated with an object to be engaged by the manipulator means, the first and second cue means comprising means which are distinct and identifiable in said camera space from the remainder of the system and any surrounding environment, the first and second visual cue means providing descriptions of three-dimensional physical space maneuver objectives as admissible configurations of the visual cue means in the two-dimensional camera spaces of the camera means; and a control means operatively connected to the manipulator means and the camera means, the control means including computing means for receiving the signal from the manipulator means identifying the approximate position and orientation of the manipulator means with respect to the base through the use of previously known kinematics, and signal processing means which identifies and tracks the visual cue means in the camera spaces and converts such into two-dimensional camera space cue position signals, the manipulator approximate position and orientation signal and the camera space cue position signals being used in the control means to estimate the relationship between the position and orientation of the manipulator means and the location in each camera space of the visual cue means placed on the manipulator means, and, using the current estimations of these relationships, select required movement and orientation of the manipulator means which will bring about admissible configurations of the visual cue means in each camera space ensure successful engagement of the object in physical space, and to control orientation of the manipulator means in physical space according to the selected movement and orientation commands resultant from the estimated relationship.

2. The system claim 1 wherein the manipulator means comprises an arm, the arm being rotatable in a plane about a rotational axis associated with the base of the manipulator means.

3. The system of claim 1 wherein said manipulator means comprises an arm movable in a plurality of directions relative to the base of the manipulator means.

4. The system of claim 1 wherein the outward end of the manipulator means comprises a grasping means.

5. The system of claim 1 wherein the outer end of the manipulator means comprises a receiving means.

6. The system of claim 1 wherein the first and second visual cue means comprise distinct and identifiable markings from the remainder of the system and the surrounding environment.

7. The system of claim 1 wherein the camera means being movable in orientation.

8. The system of claim 1 wherein the location of any of the camera means is not required to be known.

9. The system of claim 1 comprising two camera means.

10. The system of claim 1 wherein the camera means has zoom focusing capabilities.

11. The system of claim 1 further comprising visual cue means associated with the end of the manipulator means and adjacent to the base of the manipulator means.

12. The system of claim 1 wherein the first visual cue means is positioned on the outward end of the manipulator means.

13. The system of claim 1 wherein the second cue means is positioned on the object grasped by the outward end of the manipulator means.

14. The system of claim 1 wherein the object is fixed in the work space.

15. The system of claim 1 wherein the object is not fixed in the workspace.

16. The system of claim 1 wherein the object is interjected into the workspace.

17. The system of claim 1 wherein said control means controls said motor means which moves the manipulator means.

18. A method of camera space manipulation utilizing at least one camera means for engaging an articulatable ,amputator means with an object there is not required any known prior three-dimensional physical space relationship between the manipulator means the object, and the camera means and between physical space and the two-dimensional image at the focal plane of the camera means, denoted as camera space, comprising the steps of:

orienting the camera means to view the manipulator means which has an arm extending from a base to an outward end and being movable in a physical work space with known nominal kinematics relative to the base, the manipulator means including a motor means which articulates the manipulator means in said physical work space, and means for producing a. signal identifying the approximate position and orientation of the manipulator means with respect only to the base in said physical work space, each camera means being positioned and oriented in said physical work space without any previously known relation and correlation to the manipulator means except that each camera means must provide, at least intermittently, camera vision of at least the outward end of the manipulator means in at least part of the physical work space to view at least the outward end of the manipulator means in the camera space;

placing a first visual cue means in association with the outward end of the arm means;

placing a second visual cue means in association with the object to be engaged by the manipulator means, the first and second visual cue means comprising means which are distinct and identifiable in said camera space from the remainder of the system and any surrounding environment, the first and second visual cue means providing descriptions of three-dimensional physical space maneuver objectives as admissible configurations of the visual cue means in the two-dimensional camera space of each camera;

receiving signals from the manipulator means and identifying the approximate position and orientation of the manipulator means with respect to the base through the use of the known nominal kinematics;

identifying and tracking the visual cue means in the two dimensional camera space of each camera means and continuously estimating the relationship between the position and orientation of the manipulator means and the location in each camera space the visual cue means placed on the manipulator means, and using the current estimations of these relationships to select the movement and to command the orientation of the manipulator means which will bring about admissible configurations of the visual cue means in each camera space which ensure successful engagement of the object; and continuously controlling movement and orientation of the manipulator means according to such selected movement and orientation commands to achieve engagement of the manipulator means with the object in said physical work space.

* * * * *

UNITED STATES PATENT AND TRADEMARK OFFICE
CERTIFICATE OF CORRECTION

PATENT NO. : 4,833,383

DATED : May 23, 1989

INVENTOR(S) : Steven B. Skaar, et al.

It is certified that error appears in the above—identified patent and that said Letters Patent is hereby corrected as shown below:

ON TITLE PAGE:

Delete Patentee name "Skarr et al." on line below [19] and
   substitute -- Skaar et al. --, and at [75], first line
   delete "Steven B. Skarr" and substitute -- Steven B. Skaar --.

Delete "Tass" at column 1, line 22 and substitute -- Tasks --.

In the claims:
   Col. 18, line 33, after "means" insert -- , --.
   Col. 18, line 36, after "means" insert -- , --.
   Col. 18, line 37, after "means," insert -- and --.
   Col. 18, line 58, delete "tee" and sbustitute -- the --.
   Col. 18, line 61, delete "one" and substitute -- cue --.
   Col. 19, line 26, delete "the".
   Col. 19, line 27, after "space" insert -- which --.
   Col. 19, line 55, after "comprising" insert -- an additional --.
   Col. 19, line 62, after "second" insert -- visual --.
   Col. 20, line 7, delete "an".

UNITED STATES PATENT AND TRADEMARK OFFICE
CERTIFICATE OF CORRECTION

PATENT NO. : 4,833,383

DATED : May 23, 1989

INVENTOR(S) : Steven B. Skaar, et al.

It is certified that error appears in the above-identified patent and that said Letters Patent is hereby corrected as shown below:

```
Col. 20, line  8, delete ",amputator" and substitute
    -- manipulator --.
Col. 20, line  8, after "object" insert -- where --.
Col. 20, line 10, after "means"  insert -- , --.
Col. 20, line 55, after "space"  insert -- of --.
```

Signed and Sealed this

Second Day of June, 1992

Attest:

DOUGLAS B. COMER

Attesting Officer    Acting Commissioner of Patents and Trademarks